United States Patent
Fujiwara et al.

(10) Patent No.: US 11,466,127 B2
(45) Date of Patent: Oct. 11, 2022

(54) BLOCK COPOLYMER COMPRISING BLOCK HAVING POLYSILANE SKELETON AND BLOCK HAVING POLYSILAZANE SKELETON

(71) Applicant: Merck Patent GmbH, Darmstadt (DE)

(72) Inventors: Takashi Fujiwara, Kakegawa (JP); Yuji Tashiro, Fujimino (JP)

(73) Assignee: MERCK PATENT GMBH, Darmstadt (DE)

(*) Notice: Subject to any disclaimer, the term of this patent is extended or adjusted under 35 U.S.C. 154(b) by 0 days.

(21) Appl. No.: 16/972,354

(22) PCT Filed: May 29, 2019

(86) PCT No.: PCT/EP2019/063910
§ 371 (c)(1),
(2) Date: Dec. 4, 2020

(87) PCT Pub. No.: WO2019/233838
PCT Pub. Date: Dec. 12, 2019

(65) Prior Publication Data
US 2021/0230374 A1    Jul. 29, 2021

(30) Foreign Application Priority Data
Jun. 4, 2018 (JP) .............................. JP2018-107089

(51) Int. Cl.
*C08G 77/06* (2006.01)
*C08G 77/62* (2006.01)
*C08G 77/452* (2006.01)

(52) U.S. Cl.
CPC ........... *C08G 77/62* (2013.01); *C08G 77/452* (2013.01); *C08G 77/06* (2013.01)

(58) Field of Classification Search
CPC ....... C08G 77/62; C08G 77/452; C08G 77/06
See application file for complete search history.

(56) References Cited

U.S. PATENT DOCUMENTS

| | | | | |
|---|---|---|---|---|
| 5,322,913 A | * | 6/1994 | Blum | ..................... C04B 35/16 264/239 |
| 2008/0305611 A1 | * | 12/2008 | Hirota | ............... H01L 21/02337 438/425 |
| 2010/0163791 A1 | * | 7/2010 | Fukui | ..................... C01B 33/20 252/182.1 |
| 2012/0214006 A1 | * | 8/2012 | Chen | .................... C09D 183/16 428/447 |
| 2015/0225508 A1 | * | 8/2015 | Song | ..................... C08G 77/54 438/789 |

FOREIGN PATENT DOCUMENTS

| | | |
|---|---|---|
| JP | 01-138108 A | 5/1989 |
| JP | 2013-509414 A | 3/2013 |

OTHER PUBLICATIONS

International Preliminary Reporton Patentability received for PCT Patent Application No. PCT/EP2019/063910, dated Dec. 17, 2020, 7 pages.
International Search Report and Written Opinion received for PCT Patent Application No. PCT/EP2019/063910, dated Aug. 5, 2019, 8 pages.

* cited by examiner

*Primary Examiner* — Margaret G Moore
(74) *Attorney, Agent, or Firm* — Faegre Drinker Biddle & Reath LLP

(57) ABSTRACT

[Problem] To provide a novel polymer, which fills trenches having narrow widths and high aspect ratios and can form a thicker film. [Means for Solution] The block copolymer comprises a linear or cyclic block A having a polysilane skeleton comprising 5 or more silicon and a block B having a polysilazane skeleton comprising 20 or more silicon.

13 Claims, No Drawings

BLOCK COPOLYMER COMPRISING BLOCK HAVING POLYSILANE SKELETON AND BLOCK HAVING POLYSILAZANE SKELETON

CROSS-REFERENCE TO RELATED APPLICATIONS

This application is a national stage application (under 35 U.S.C. § 371) of PCT/EP2019/063910, filed May 29, 2019, which claims benefit of Japanese Application No. 2018-107089, filed Jun. 4, 2018, both of which are incorporated herein by reference in their entirety.

BACKGROUND OF THE INVENTION

Technical Field

The present invention relates to a block copolymer comprising a block having a polysilane skeleton and a block having a polysilazane skeleton.

Background Art

In the manufacture of electronic devices, especially semiconductor devices, an interlayer insulating film is formed between a transistor element and a bit line, between a bit line and a capacitor, between a capacitor and a metal wiring and between plural metal wirings, etc. Further, an insulating material is embedded in an isolation trench provided on a substrate surface or the like. Furthermore, after forming a semiconductor device on a substrate surface, a coating layer is formed using a sealing material to form a package. Such an interlayer insulating film or coating layer is often formed of a siliceous material.

As a method for forming the siliceous film, a chemical vapor deposition method (CVD method), a sol-gel method, a method for coating and baking a composition comprising a silicon-containing polymer, and the like are used. Among them, a method for forming a siliceous film using a composition is often adopted, since it is relatively simple.

In order to form such a siliceous film, a composition comprising a silicon-containing polymer, such as polysilazane, polysiloxane, polysiloxazane, or polysilane, is coated on a surface of substrate or the like and then baked, whereby silicon that is contained in the polymer is oxidized to form a siliceous film.

In semiconductor devices, materials that can fill trenches having narrow widths and high aspect ratios without causing defects such as voids, and that can form a high density film when baked have been always required. Furthermore, as the 3D NAND technology accelerates, it is required to be capable of forming a thicker film than before.

PRIOR ART DOCUMENTS

Patent Documents

[Patent document 1] JP 2013-509414 A

SUMMARY OF THE INVENTION

Problems to be Solved by the Invention

A novel polymer, which fills trenches having narrow widths and high aspect ratios and can form a thick film, is provided.

Means for Solving the Problems

The block copolymer according to the present invention comprises:
a linear or cyclic block A having a polysilane skeleton comprising 5 or more silicon; and
a block B having a polysilazane skeleton comprising 20 or more silicon,
wherein, at least one silicon in the block A and at least one silicon in the block B are connected by a single bond and/or a crosslinking group comprising silicon.

Further, the method for producing the block copolymer according to the present invention comprises:
(A) a step of irradiating a cyclic polysilane comprising 5 or more silicon with light;
(B) a step of preparing a mixture comprising the light-irradiated cyclic polysilane comprising 5 or more silicon and a polysilazane comprising 20 or more silicon; and
(C) a step of irradiating said mixture with light.

EFFECTS OF THE INVENTION

The block copolymers according to the present invention fills trenches having narrow widths and high aspect ratios and also enable forming a thick film. Further, when a film is formed using this block copolymer, a high density film can be formed.

DETAILED DESCRIPTION OF THE INVENTION

Mode for Carrying Out the Invention

Embodiments of the present invention are described below in detail. Hereinafter, symbols, units, abbreviations, and terms have the following meanings in the present specification unless otherwise specified.

In the present specification, when numerical ranges are indicated using "to", they include both end points, and the units thereof are common. For example, 5 to 25 mol % means 5 mol % or more and 25 mol % or less.

In the present specification, the hydrocarbon means one including carbon and hydrogen, and optionally including oxygen or nitrogen. The hydrocarbyl group means a monovalent or divalent or higher valent hydrocarbon.

In the present specification, the aliphatic hydrocarbon means a linear, branched or cyclic aliphatic hydrocarbon, and the aliphatic hydrocarbon group means a monovalent or divalent or higher valent aliphatic hydrocarbon. The aromatic hydrocarbon means a hydrocarbon comprising an aromatic ring which may optionally not only comprise an aliphatic hydrocarbon group as a substituent but also be condensed with an alicycle. The aromatic hydrocarbon group means a monovalent or divalent or higher valent aromatic hydrocarbon. These aliphatic hydrocarbon groups and aromatic hydrocarbon groups optionally contain fluorine, oxy, hydroxy, amino, carbonyl, or silyl and the like. Further, the aromatic ring means a hydrocarbon comprising a conjugated unsaturated ring structure, and the alicycle means a hydrocarbon comprising a ring structure but no conjugated unsaturated ring structure.

In the present specification, the alkyl means a group obtained by removing any one hydrogen from a linear or branched, saturated hydrocarbon and includes a linear alkyl and branched alkyl, and the cycloalkyl means a group obtained by removing one hydrogen from a saturated hydrocarbon comprising a cyclic structure and includes a linear or branched alkyl in the cyclic structure as a side chain, if necessary.

In the present specification, the aryl means a group obtained by removing any one hydrogen from an aromatic hydrocarbon. The alkylene means a group obtained by removing any two hydrogen from a linear or branched, saturated hydrocarbon. The arylene means a hydrocarbon group obtained by removing any two hydrogen from an aromatic hydrocarbon.

In the present specification, the description such as "$C_{x-y}$", "$C_x$-$C_y$" and "$C_x$" means the number of carbons in the molecule or substituent group. For example, $C_{1-6}$ alkyl means alkyl having 1 to 6 carbons (such as methyl, ethyl, propyl, butyl, pentyl and hexyl). Further, the fluoroalkyl as used in the present specification refers to one in which one or more hydrogen in alkyl is replaced with fluorine, and the fluoroaryl is one in which one or more hydrogen in aryl are replaced with fluorine.

In the present specification, when a polymer comprises plural types of repeating units, these repeating units copolymerize. These copolymerizations can be any of alternating copolymerization, random copolymerization, block copolymerization, graft copolymerization, or any mixture thereof.

In the present specification, "%" represents weight % and "ratio" represents ratio by weight.

In the present specification, Celsius is used as the temperature unit. For example, 20 degrees means 20 degrees Celsius.

<Block Copolymer>

The block copolymer according to the present invention comprises:
a linear or cyclic block A having a polysilane skeleton comprising 5 or more silicon; and
a block B having a polysilazane skeleton comprising 20 or more silicon,
wherein at least one silicon in the block A and at least one silicon in the block B are connected by a single bond and/or a crosslinking group comprising silicon.

In the present invention, the block copolymer refers to a polymer comprising at least one block A described above and at least one block B described above. When plural block A or plural block B exist, they can be different structures, respectively. The block A and the block B can be arranged at random or can be alternately arranged. Further, like a graft polymer, for example, one or plural block A can be connected in some places, like a branch, to a block B that serves as a trunk.

Further, between the blocks may be directly linked, or may be linked via, for example, a silicon compound.

Furthermore, in one molecule, a block A and a block B, a block A and another block A, or a block B and another block B can be bonded by crosslinking.

In the present invention, the polysilane skeleton refers to a skeleton having a main chain composed only of Si—Si bonds.

In the present invention, the polysilazane skeleton refers to a skeleton having a main chain composed of repeating units of Si—N bond.

Preferably, the block A comprises 5 or more repeating units selected from the group consisting of the following formulae (I-1) to (I-3):

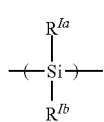
(I-1)

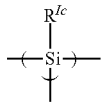
(I-2)

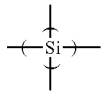
(I-3)

(wherein $R^{Ia}$, $R^{Ib}$ and $R^{Ic}$ are each independently hydrogen, halogen, $C_{1-6}$ alkyl or $C_{6-10}$ aryl), and the block B comprises 20 or more repeating units selected from the group consisting of the following formulae (II-1) to (II-6):

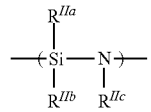
(II-1)

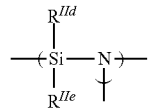
(II-2)

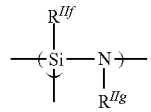
(II-3)

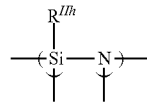
(II-4)

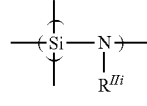
(II-5)

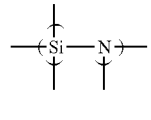
(II-6)

(wherein $R^{IIa}$ to $R^{IIi}$ are each independently hydrogen or $C_{1-4}$ alkyl).

Examples of $R^{Ia}$, $R^{Ib}$ and $R^{Ic}$ in the block A include hydrogen, methyl, ethyl, n-propyl, isopropyl, n-butyl, isobutyl, phenyl, tolyl and xylyl. Preferably, all of $R^{Ia}$, $R^{Ib}$ and $R^{Ic}$ are hydrogen.

Although the combination of the repeating units (I-1), (I-2) and (I-3) is not particularly limited, it is preferable that at least one of (I-2) or (I-3) is contained.

The number of the block A in one molecule is preferably 1 to 15, more preferably 3 to 10.

In the case where the block A is linear, the total number of repeating units of the formulae (I-1) to (I-3) constituting one block A is preferably 5 to 20, more preferably 5 to 15. At this time, it is preferable that each repeating unit is directly bonded to form Si—Si bond.

It is preferable that at least one of the block A is one represented by the following formula (I-4):

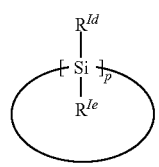

(I-4)

(wherein $R^{Id}$ and $R^{Ie}$ are each independently hydrogen, halogen, $C_{1-6}$ alkyl, $C_{6-10}$ aryl or a single bond, provided that at least one of $R^{Id}$ and $R^{Ie}$ is a single bond, and p is an integer of 5 or more).

Preferably, p is 5 or 6.

Preferably, the above single bond is directly linked to another block A or the block B.

Preferably, one of $R^{Id}$ and $R^{Ie}$ is a single bond and all of the others are hydrogen.

Examples of $R^{IIa}$ to $R^{IIi}$ in the block B include hydrogen, methyl, ethyl, n-propyl, isopropyl, n-butyl and isobutyl. Preferably, all of $R^{IIa}$ to $R^{IIi}$ are hydrogen.

Although the combination of the repeating units (II-1) to (II-6) is not particularly limited, it is preferable that at least one of (II-3) to (II-6) is contained.

The number of the repeating units in one block B is 20 or more, preferably 20 to 350, more preferably 20 to 130. It is preferable that each repeating unit is directly bonded without intervening any repeating unit other than (II-1) to (II-6).

The number of the block B in one molecule is preferably 1 to 24, more preferably 1 to 6.

The block copolymer according to the present invention preferably further comprises a crosslinking group comprising silicon, which crosslinks the block A each other, the block B each other, or between the block A and the block B.

Examples of the crosslinking group comprising silicon include —$Si_2R_4$— (wherein R is each independently hydrogen, halogen, alkyl or alkoxy, preferably hydrogen or Cl).

Although the combination of the block A and the block B is not particularly limited, the ratio of the total number of the repeating units of formulae (I-1) to (I-3) to that of the repeating units of the formulae (II-1) to (II-6) (in the present invention, sometimes referred to as "repeating unit ratio") is preferably 8 to 100%, more preferably 15 to 95%.

As the method for measuring the repeating unit ratio, for example, in the spectrum obtained by quantitative $^{29}Si$—NMR in accordance with inverse gate decoupling method (in the present invention, sometimes referred to as "$^{29}Si$—NMR"), it can be measured by a ratio of the peak area detected at −95 ppm to −115 ppm with respect to the peak area detected at −25 ppm to −55 ppm.

In the present invention, the measurement of $^{29}Si$—NMR can be specifically carried out as follows.

First, a solvent is removed, using an evaporator, from the block copolymer according to the present invention obtained by synthesis, and 0.4 g of the obtained block copolymer is dissolved in 1.6 g of a deuterated solvent such as deuterated chloroform (manufactured by Kanto Chemical Co., Inc.) to obtain a sample solution. Using a JNM-ECS 400 type nuclear magnetic resonance apparatus (trade name, manufactured by JEOL Ltd.), a $^{29}Si$—NMR spectrum of the sample solution is obtained by measuring 1,000 times. In NMR spectra, a peak assigned to Si containing in a polysilazane skeleton (δ=about −25 to −55 ppm) and a peak assigned to Si containing in a polysilane skeleton (δ=about −95 to −115 ppm) are recognized.

The ratio of the number of N atoms containing in the molecule to that of Si atoms containing in the molecule (in the present invention, sometimes referred to as "N/Si ratio") is preferably 25 to 95%, more preferably 30 to 90%.

The N/Si ratio of the polymer molecule can be calculated, for example, from an element ratio obtained by subjecting a film formed using the polymer to elemental analysis by Rutherford backscattering spectroscopy. Specifically, it can be measured as described below. The block copolymer solution comprising the block copolymer solution according to the present invention and the solvent is spin-coated on a 4 inch wafer at a rotation speed of 1,000 rpm using a spin coater (Spin Coater 1HDX2 (trade name), manufactured by Mikasa Co., Ltd.) under a nitrogen atmosphere. The obtained coating film is baked at 240° C. for 10 minutes under a nitrogen atmosphere. The baked film is subjected to elemental analysis by Rutherford backscattering spectrometry using Pelletron 3SDH (trade name, manufactured by National Electrostatics Corporation), whereby an atomic number ratio is measured.

A plurality of block A can be connected, as side chains, to a main chain comprising the block B.

Because of the solubility of the block polymer in the solvent, the planarization of the block polymer film and the adhesion to the substrate, the mass average molecular weight of the block copolymer according to the present invention is preferably 1,100 to 25,000, more preferably 2,000 to 20,000, and particularly preferably 2,500 to 10,000. The mass average molecular weight is a mass average molecular weight in terms of polystyrene, and it can be measured by gel permeation chromatography based on polystyrene.

<Method for Producing Block Copolymer>

The method for producing the block copolymer according to the present invention comprises:

(A) a step of irradiating a cyclic polysilane comprising 5 or more silicon with light;

(B) a step of preparing a mixture comprising the light-irradiated cyclic polysilane comprising 5 or more silicon and a polysilazane comprising 20 or more silicon; and (C) a step of irradiating said mixture with light.

Hereinafter, an example of the production method is described for each step.

(A) Step of Irradiating Cyclic Polysilane Comprising 5 or more Silicon with Light The cyclic polysilane comprising 5 or more silicon (hereinafter sometimes referred to as "cyclic polysilane") used in the production method according to the present invention can be freely selected unless it impairs the effect of the present invention. These are either inorganic compounds or organic compounds and can be linear, branched, or partially having a cyclic structure.

Preferably, the cyclic polysilane is represented by the following formula (I-5):

(I-5)

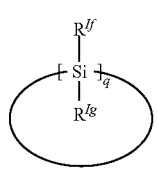

(wherein, $R^{If}$ and $R^{Ig}$ are each independently hydrogen, halogen, $C_{1-6}$ alkyl or $C_{6-10}$ aryl, and q is an integer of 5 or more).

Preferably, q is 5 to 8, more preferably 5 or 6.

Examples of the preferred cyclic polysilane include silyl cyclopentasilane, silyl cyclohexasilane, disilyl cyclohexasilane, cyclopentasilane and cyclohexasilane, preferably cyclopentasilane or cyclohexasilane.

The wavelength of irradiation light in the step (A) preferably comprises at least a wavelength of 172 to 405 nm, more preferably 282 to 405 nm. The irradiation intensity is preferably 10 to 250 mW/cm², more preferably 50 to 150 mW/cm², and the irradiation time is preferably 30 to 300 seconds, more preferably 50 to 200 seconds.

Since cyclopentasilane or cyclohexasilane is a liquid at room temperature, light can be irradiated to the cyclic polysilane being in its liquid state while stirring. In addition, when cyclosilane is a solid, it can be dissolved in an appropriate solvent and irradiated with light while stirring.

In addition, it is considered that some or all of the cyclic polysilane undergo ring-opening reaction by the light irradiation in this step.

(B) Step of Preparing Mixture Comprising the Light-Irradiated Cyclic Polysilane Comprising 5 or more Silicon and Polysilazane Comprising 20 or more Silicon In this step, a mixture comprising the cyclic polysilane irradiated with light in the step (A) and a polysilazane comprising 20 or more silicon (hereinafter sometimes referred to as "polysilazane") is prepared. It is preferred that the mixture further comprises a crosslinking agent comprising silicon.

The polysilazane used in the production method according to the present invention can be freely selected unless it impairs the effect of the present invention. These are either inorganic compounds or organic compounds, and can be linear, branched, or partially having a cyclic structure.

The polysilazane used in the production method according to the present invention is preferably comprises at least 20 repeating units selected from the group consisting of the following formulae (II-1) to (II-6):

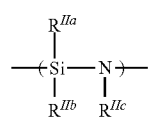
(II-1)

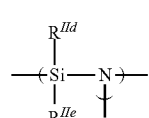
(II-2)

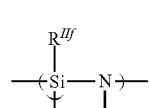
(II-3)

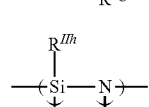
(II-4)

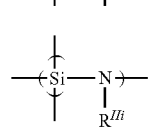
(II-5)

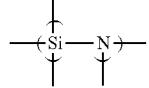
(II-6)

(wherein $R^{IIa}$ to $R^{IIi}$ are each independently hydrogen or $C_{1-4}$ alkyl).

More preferably, the polysilazane used in the production method according to the present invention is perhydropolysilazane (hereinafter referred to as "PHPS"). PHPS is a silicon-containing polymer comprising Si—N bonds as repeating units and consisting only of Si, N and H. In this PHPS, except Si—N bond, all elements binding to Si or N are H and any other elements such as carbon or oxygen are not substantially contained. The simplest structure of the perhydropolysilazane is a chain structure having a repeating unit of the following formula (I):

(I)

In the present invention, any PHPS having a chain structure and a cyclic structure in the molecule can be used, and examples of the PHPS include those comprising repeating units represented by the following formulae (Ia)' to (If)' and a terminal group represented by the following formula (Ig)' in the molecule:

(Ia)'

(Ib)'

(Ic)'

(Id)'

(Ie)'

(If)'

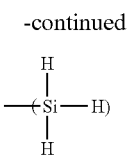

Such a PHPS is one having a branched structure or a cyclic structure in the molecule, and an example of a specific partial structure of such a PHPS is one represented by the following formula:

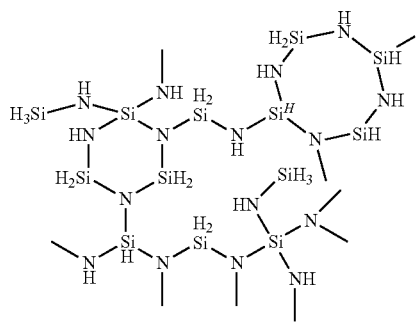

Further, it has or has not a structure represented by the following formula, i.e. a structure wherein plural Si—N molecular chains are crosslinked:

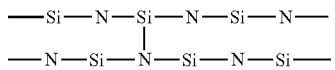

As far as the PHPS according to the present invention comprises Si—N bonds as the repeating unit and is a silicon-containing polymer consisting only of Si, N and H, its structure is not limited, and other various structures exemplified above are possible. For example, it can be one having a structure composed by combining the above-described linear structure, cyclic structure and crosslinked structure. In addition, the PHPS in the present invention is preferably one having a cyclic structure or crosslinked structure, particularly crosslinked structure.

From the viewpoint of the solubility in solvents and the reactivity, the mass average molecular weight of the polysilazane used in the production method according to the present invention is preferably 900 to 15,000, more preferably 900 to 10,000. The mass average molecular weight is a mass average molecular weight in terms of polystyrene, and it can be measured by gel permeation chromatography based on polystyrene.

The crosslinking agent used in the production method of the present invention comprises silicon. This crosslinking agent is preferably bifunctional or higher functional. Examples of such a crosslinking agent include a halogenated silane compound, an alkoxysilane compound, and specifically hexachlorodisilane, 1,1,2,2-tetrachloro-1,2-dimethyldisilane, 1,2-dichlorodisilane, 1,1-dichlorodisilane, 1,2-dichlorotetramethyldisilane, octachlorotrisilane, 1,1,1,3,3,3-hexachloro-2,2-dimethyltrisilane, dichlorosilane, methyldichlorosilane, dichlorodimethylsilane, trichlorosilane, methyltrichlorosilane, hexachlorodisilazane, tetrachlorodisilazane, hexachlorodisiloxane, 1,1,3,3-tetrachloro-1,3-dimethyldisiloxane, 1,3-dichloro-1,1,3,3-tetramethyldisiloxane, 1,3-dichlorodisiloxane, bistrichlorosilylacetylene, 1,2-bistrichlorosilylethene, 1,2-bisdichloromethylsilylethene, trimethoxysilane, methyltrimethoxysilane, methyldimethoxysilane, dimethoxydimethylsilane, triethoxysilane, diethoxysilane, methyldiethoxysilane, diethoxydimethylsilane, and the like.

This crosslinking agent crosslinks a polysilane and a polysilazane, polysilane each other or polysilazane each other. Since the block copolymer that is crosslinked in this way suppresses the phase separation between the block A and the block B, it is considered that forming a uniform film becomes easier at the time of forming a cured film.

The molecular weight of the crosslinking agent used in the production method of the present invention is preferably 100 to 350, more preferably 125 to 270.

(C) Step of Irradiating Said Mixture with Light

It is considered that the reaction of polycondensation of the block A and the block B occurs by light irradiation in this step. The wavelength of irradiation light at this time preferably includes at least a wavelength of 172 to 405 nm, more preferably 282 to 405 nm. The irradiation intensity is preferably 10 to 250 mW/cm$^2$, more preferably 50 to 150 mW/cm$^2$, and the irradiation time is preferably 5 to 100 minutes, more preferably 5 to 60 minutes. The irradiation energy is preferably 3 to 1,500 J, more preferably 25 to 500 J.

The above-mentioned steps (A) to (C) are preferably carried out under an inert gas atmosphere.

After the step (C), a solvent such as cyclooctane is added, and byproducts are removed by filtration using a filter to obtain the desired product. This product is the block copolymer of the invention having two types of blocks.

By adding a solvent into the resulting block copolymer and applying the mixture, a coating film having a thickness of 1.6 to 15 μm, preferably 2 to 15 μm, and more preferably 3 to 11 μm can be formed. The coating film is oxidized to form a siliceous film.

Hereinafter, the present invention is explained with reference to Examples. These Examples are for explanation and are not intended to limit the scope of the present invention.

In addition, in the following description, "part" is on a weight basis unless otherwise specified.

The reaction steps in the following Examples were all carried out in a glove box controlled to have an oxygen concentration of 1.0 ppm or less and a dew point temperature of −76.0° C. or less under an inert gas atmosphere.

Synthesis Example 1: Block Copolymer I

A stirrer tip was placed in a 6 mL screw tube, and 0.22 g (1.24 mmol) of cyclohexasilane was added thereto and stirred using a stirrer. Ultraviolet ray having a wavelength of 365 nm using a mercury xenon lamp as a light source was irradiated through an optical fiber at an irradiation intensity of 11 mW/cm$^2$ for 180 seconds. After the ultraviolet irradiation, 0.69 g (7.7 mmol) of polyperhydrosilazane adjusted to 50 mass % with cyclooctane and having a mass average molecular weight of 1,050, and 0.20 g (0.76 mmol) of hexachlorodisilane as a crosslinking agent were added. While continuing to stir, ultraviolet ray having a wavelength of 365 nm using a mercury xenon lamp as a light source was irradiated through an optical fiber at an irradiation intensity of 82 mW/cm$^2$ for 45 minutes. After the reaction, 0.52 g of cyclooctane was added and after stirring for 3 minutes, filtration was carried out using a 5.0 μm PTFE filter (Syringe filter, manufactured by Whatman) and 0.2 pm PTFE filter (DISMIC-13JP, manufactured by Advantec). The byproducts were removed to obtain a block copolymer I solution having a mass average molecular weight of 2,800.

Synthesis Example 2: Block Copolymer II

A stirrer tip was placed in a 6 mL screw tube, and 0.35 g (2.03 mmol) of cyclohexasilane was added thereto and stirred using a stirrer. Ultraviolet ray having a wavelength of 365 nm using a mercury xenon lamp as a light source was irradiated through an optical fiber at an irradiation intensity of 82 mW/cm$^2$ for 105 seconds. After the ultraviolet irradiation, 1.12 g (12.41 mmol) of polyperhydrosilazane adjusted to 50 mass % with cyclooctane and having a mass average molecular weight of 2,400, and 0.15 g (1.13 mmol) of trichlorosilane as a crosslinking agent were added. While continuing to stir, ultraviolet ray having a wavelength of 365 nm using a mercury xenon lamp as a light source was irradiated through an optical fiber at an irradiation intensity of 82 mW/cm$^2$ for 45 minutes. After the reaction, 0.89 g of cyclooctane was added and after stirring for 3 minutes, filtration was carried out using a 5.0 μm PTFE filter and 0.2 μm PTFE filter. The byproducts were removed to obtain a block copolymer II solution having a mass average molecular weight of 5,160.

Synthesis Example 3: Block Copolymer III

A stirrer tip was placed in a 6 mL screw tube, and 0.31 g (1.77 mmol) of cyclohexasilane was added thereto and stirred using a stirrer. Ultraviolet ray having a wavelength of 365 nm using a mercury xenon lamp as a light source was irradiated through an optical fiber at an irradiation intensity of 82 mW/cm$^2$ for 105 seconds. After the ultraviolet irradiation, 0.97 g (10.80 mmol) of polyperhydrosilazane adjusted to 50 mass % with cyclooctane and having a mass average molecular weight of 8,250 was added. While continuing to stir, ultraviolet ray having a wavelength of 365 nm using a mercury xenon lamp as a light source was irradiated through an optical fiber at an irradiation intensity of 82 mW/cm$^2$ for 45 minutes. After the reaction, 0.89 g of cyclooctane was added and after stirring for 3 minutes, filtration was carried out using a 5.0 μm PTFE filter and 0.2 μm PTFE filter. The byproducts were removed to obtain a block copolymer III solution having a mass average molecular weight of 9,050.

Synthesis Example 4: Block Copolymer IV

A stirrer tip was placed in a 20 mL screw tube, and 0.35 g (2.03 mmol) of cyclohexasilane was added thereto and stirred using a stirrer. Ultraviolet ray having a wavelength of 254 nm using a low-pressure mercury lamp as a light source was irradiated through an optical fiber at an irradiation intensity of 12 mW/cm$^2$ for 180 seconds. After the ultraviolet irradiation, 5.45 g (60.51 mmol) of polyperhydrosilazane adjusted to 50 mass % with cyclooctane and having a mass average molecular weight of 5,500, and 0.17 g (1.13 mmol) of methyltrichlorosilane as a crosslinking agent were added. While continuing to stir, ultraviolet ray having a wavelength of 254 nm using a low-pressure mercury lamp as a light source was irradiated through an optical fiber at an irradiation intensity of 12 mW/cm$^2$ for 60 minutes. After the reaction, 6.2 g of cyclooctane was added and after stirring for 3 minutes, filtration was carried out using a 5.0 μm PTFE filter and 0.2 μm PTFE filter. The byproducts were removed to obtain a block copolymer IV solution having a mass average molecular weight of 6,550.

Synthesis Example 5: Block Copolymer V

A stirrer tip was placed in a 50 mL screw tube, and 0.35 g (2.01 mmol) of cyclohexasilane was added thereto and stirred using a stirrer. Ultraviolet ray having a wavelength of 405 nm using an extra high-pressure mercury lamp as a light source was irradiated through an optical fiber at an irradiation intensity of 60 mW/cm$^2$ for 120 seconds. After the ultraviolet irradiation, 10.8 g (120.2 mmol) of polyperhydrosilazane adjusted to 50 mass % with cyclooctane and having a mass average molecular weight of 1,300, and 0.19 g (1.15 mmol) of triethoxysilane as a crosslinking agent were added. While continuing to stir, ultraviolet ray having a wavelength of 405 nm using an extra high-pressure mercury lamp as a light source was irradiated through an optical fiber at an irradiation intensity of 60 mW/cm$^2$ for 60 minutes. After the reaction, 12.7 g of cyclooctane was added and after stirring for 3 minutes, filtration was carried out using a 5.0 μm PTFE filter and 0.2 μm PTFE filter. The byproducts were removed to obtain a block copolymer V solution having a mass average molecular weight of 8,220.

Synthesis Example 6: Block Copolymer VI

A stirrer tip was placed in a 10 mL screw tube, and 0.73 g (4.2 mmol) of cyclohexasilane was added thereto and stirred using a stirrer. Ultraviolet ray having a wavelength of 254 nm using a low-pressure mercury lamp as a light source was irradiated through an optical fiber at an irradiation intensity of 12 mW/cm$^2$ for 180 seconds. After the ultraviolet irradiation, 0.97 g (10.8 mmol) of polyperhydrosilazane adjusted to 50 mass % with cyclooctane and having a mass average molecular weight of 2,400, and 0.31 g (2.3 mmol) of trichlorosilane as a crosslinking agent were added. While continuing to stir, ultraviolet ray having a wavelength of 254 nm using a low-pressure mercury lamp as a light source was irradiated through an optical fiber at an irradiation intensity of 12 mW/cm$^2$ for 60 minutes. After the reaction, 2.2 g of cyclooctane was added and after stirring for 3 minutes, filtration was carried out using a 5.0 μm PTFE filter and 0.2 μm PTFE filter. The byproducts were removed to obtain a block copolymer VI solution having a mass average molecular weight of 5,380.

Synthesis Example 7: Block Copolymer VII

A stirrer tip was placed in a 50 mL screw tube, and 0.22 g (1.24 mmol) of cyclohexasilane was added thereto and stirred using a stirrer. Ultraviolet ray having a wavelength of 365 nm using a mercury xenon lamp as a light source was irradiated through an optical fiber at an irradiation intensity of 82 mW/cm$^2$ for 105 seconds. After the ultraviolet irradiation, 9.76 g (108.44 mmol) of polyperhydrosilazane adjusted to 50 mass % with cyclooctane and having a mass average molecular weight of 2,400, and 0.15 g (1.13 mmol) of trichlorosilane as a crosslinking agent were added. While continuing to stir, ultraviolet ray having a wavelength of 365 nm using a mercury xenon lamp as a light source was irradiated through an optical fiber at an irradiation intensity of 82 mW/cm$^2$ for 45 minutes. After the reaction, 11.7 g of cyclooctane was added and after stirring for 3 minutes, filtration was carried out using a 5.0 μm PTFE filter and 0.2

µm PTFE filter. The byproducts were removed to obtain a block copolymer VII solution having a mass average molecular weight of 4,850.

Comparative Synthesis Example 1: Block Copolymer VIII

A stirrer tip was placed in a 6 mL screw tube, and 0.35 g (2.03 mmol) of cyclohexasilane was added thereto and stirred using a stirrer. Ultraviolet ray having a wavelength of 365 nm using a mercury xenon lamp as a light source was irradiated through an optical fiber at an irradiation intensity of 82 mW/cm$^2$ for 105 seconds. After the ultraviolet irradiation, 1.12 g (12.41 mmol) of polyperhydrosilazane adjusted to 50 mass % with cyclooctane and having a mass average molecular weight of 460, and 0.15 g (1.13 mmol) of trichlorosilane as a crosslinking agent were added. While continuing to stir, ultraviolet ray having a wavelength of 365 nm using a mercury xenon lamp as a light source was irradiated through an optical fiber at an irradiation intensity of 82 mW/cm$^2$ for 45 minutes. After the reaction, 0.89 g of cyclooctane was added and after stirring for 3 minutes, filtration was carried out using a 5.0 µm PTFE filter and 0.2 µm PTFE filter. The byproducts were removed to obtain a block copolymer VIII solution having a mass average molecular weight of 980.

Comparative Synthesis Example 2: Polysilane

A stirrer tip was placed in a 6 mL screw tube, and 0.22 g (1.24 mmol) of cyclohexasilane was added thereto and stirred using a stirrer. Ultraviolet ray having a wavelength of 365 nm using a mercury xenon lamp as a light source was irradiated through an optical fiber at an irradiation intensity of 82 mW/cm$^2$ for 105 seconds. After the irradiation, 0.76 g of cyclooctane was added and diluted, and then ultraviolet ray having a wavelength of 365 nm using a mercury xenon lamp as a light source was irradiated through an optical fiber at an irradiation intensity of 82 mW/cm$^2$ for 45 minutes. After the reaction, filtration was carried out using a 5.0 µm PTFE filter and 0.2 µm PTFE filter to obtain a polysilane solution having a mass average molecular weight of 750.

Comparative Synthesis Example 3: Polysiloxane 16.4 g (0.1 mol) of triethoxysilane and 4.5 g (0.3 mol) of tetramethoxysilane were dissolved in 150 g of ethylene glycol dimethyl ether, and a nitric acid aqueous solution prepared by adding 0.03 g (0.5 mmol) of nitric acid to 30 g of pure water was added dropwise while stirring for 1 hour. After the dropwise addition, stirring was carried out at room temperature for 3 days to obtain a polysiloxane solution having a mass average molecular weight of 1,800.

Comparative Synthesis Example 4: Polysilazane

A polyperhydrosilazane solution having a mass average molecular weight of 2,520 was obtained according to the method described in JP H01-138108 A.

The repeating unit ratio, N/Si ratio, and critical film thickness of the polymer obtained in Synthesis Examples and Comparative Synthesis Examples were measured. The measurement methods are as described below, and the obtained results are shown in Table 1.

The repeating unit ratio obtained by measuring the ratio of the peak area detected at −25 ppm to −55 ppm to the peak area detected at −95 ppm to −115 ppm in the spectrum obtained by $^{29}$Si—NMR.

With respect to the N/Si ratio, the obtained polymer solution was spin-coated on a 4-inch wafer at a rotation speed of 1,000 rpm using a spin coater (Spin Coater 1HDX2 (trade name), manufactured by Mikasa Co., Ltd.) in nitrogen. The obtained coating film was baked in nitrogen at 240° C. for 10 minutes. The baked film was measured by conducting an elemental analysis by Rutherford backscattering spectrometry using Pelletron 3SDH (trade name, manufactured by National Electrostatics Corporation).

With respect to the critical film thickness, the polymer solution obtained in Synthesis Examples and Comparative Synthesis Examples was spin-coated on a 4 inch wafer using a spin coater (Spin Coater 1HDX2 (trade name) manufactured by Mikasa Co., Ltd.) and baked at 350° C. for 30 minutes in nitrogen. The film thickness was adjusted by changing the coating rotation speed, and the film thickness that no crack was recognized by the optical microscope was defined as a critical film thickness of the polymer. The film thickness was measured with a spectroscopic ellipsometer (M-2000V (trade name), manufactured by JA Woollam Co., Inc.).

In addition, it was confirmed that the block copolymer obtained in Synthesis Examples filled a trench having a depth of 500 nm and a width of 50 nm.

TABLE 1

| | Polymer | Mass average molecular weight | Repeating unit ratio | N/Si ratio | Critical film thickness |
|---|---|---|---|---|---|
| Synthesis Example 1 | Block copolymer I | 2,800 | 97% | 45% | 10 µm |
| Synthesis Example 2 | Block copolymer II | 5,160 | 98% | 48% | 11 µm |
| Synthesis Example 3 | Block copolymer III | 9,050 | 98% | 50% | 9.2 µm |
| Synthesis Example 4 | Block copolymer IV | 6,550 | 20% | 82% | 5.5 µm |
| Synthesis Example 5 | Block copolymer V | 8,220 | 10% | 90% | 3.5 µm |
| Synthesis Example 6 | Block copolymer VI | 5,380 | 230% | 28% | 1.6 µm |
| Synthesis Example 7 | Block copolymer VII | 4,850 | 7% | 91% | 1.8 µm |
| Comparative Synthesis Example 1 | Block copolymer VIII | 980 | 98% | 48% | 1.5 µm |
| Comparative Synthesis Example 2 | Polysilane | 750 | — | 0% | 0.8 µm |
| Comparative Synthesis Example 3 | Polysiloxane | 1,800 | — | 0% | 0.2 µm |
| Comparative Synthesis Example 4 | Polysilazane | 2,520 | — | 100% | 1.2 µm |

*In Synthesis Examples 3, some ununiformity of thickness was observed on the film surface.

The invention claimed is:

1. A block copolymer comprising:
a cyclic block A having a polysilane skeleton prepared by irradiating irradiated with light a cyclic polysilane having the formula (I-4) whereby some of the cyclic polysilane skeleton has undergone ring opening:

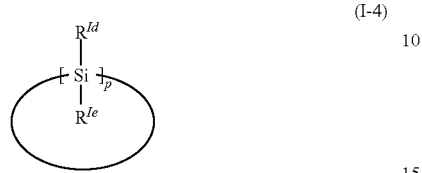
(I-4)

wherein $R^{Id}$ and $R^{Ie}$ are each independently hydrogen, halogen, $C_{1-6}$ alkyl, $C_{6-10}$ aryl or a single bond, provided that at least one of $R^{Id}$ and $R^{Ie}$ is a single bond, and p is an integer of 5 or more and wherein the cyclic block A is selected from the group consisting of silyl cyclopentasilane, silyl cyclohexasilane, disilyl cyclohexasilane and cyclohexasilane, and a block B having a polysilazane skeleton comprising 20 or more silicon, wherein at least one silicon in the block A and at least one silicon in the block B are connected by a single bond and/or a crosslinking group comprising silicon, wherein the block copolymer comprises a main chain comprising the block B and a side chain comprising the block A.

2. The block copolymer according to claim 1, wherein the mass average molecular weight of the block polymer is 1,100 to 25,000.

3. The block copolymer according to claim 1, wherein the ratio of the number of N atoms contained in the copolymer to that of Si atoms contained in the copolymer is 25 to 95%.

4. The block copolymer according to claim 1, wherein the block A and another block A, the block B and another block B, or the block A and the block B are connected by a crosslinking group comprising silicon.

5. The block copolymer according to claim 1, wherein the cyclic block A is cyclohexasilane.

6. A method for producing the block copolymer comprising:
a linear or cyclic block A having a polysilane skeleton comprising 5 or more silicon; and
a block B having a polysilazane skeleton comprising 20 or more silicon, wherein at least one silicon in the block A and at least one silicon in the block B are connected by a single bond and/or a crosslinking group comprising silicon, comprising:
(A) a step of irradiating a cyclic polysilane comprising 5 or more silicon with light;
(B) a step of preparing a mixture comprising the light-irradiated cyclic polysilane comprising 5 or more silicon and a polysilazane comprising 20 or more silicon and a crosslinking agent comprising halogenated silane compound; and
(C) a step of irradiating said mixture with light.

7. The method according to claim 6, wherein said mixture in the step (B) further comprises a crosslinking agent comprising silicon.

8. The method according to claim 6, wherein the mass average molecular weight of said polysilazane is 900 to 15,000.

9. The method according to claim 6, wherein the wavelength of the light in said step (C) is 172 to 405 nm.

10. The method according to claim 6, wherein the light energy in said step (C) is 25 to 500 J/cm².

11. The method according to claim 6, wherein said steps (A) to (C) are performed under an inert gas atmosphere.

12. The method according to claim 6, wherein the cyclic polysilane is selected from the group consisting of silyl cyclopentasilane, silyl cyclohexasilane, disilyl cyclohexasilane and cyclohexasilane.

13. The method according to claim 6, wherein the cyclic polysilane is cyclohexasilane.

* * * * *